United States Patent [19]

Claypoole et al.

[11] 4,072,400
[45] Feb. 7, 1978

[54] BUFFERED OPTICAL WAVEGUIDE FIBER

[75] Inventors: Stewart A. Claypoole, Painted Post; Daniel C. Wilhelm, Campbell, both of N.Y.

[73] Assignee: Corning Glass Works, Corning, N.Y.

[21] Appl. No.: 692,895

[22] Filed: June 4, 1976

Related U.S. Application Data

[63] Continuation-in-part of Ser. No. 593,286, July 7, 1975, abandoned.

[51] Int. Cl.² .................................................. G02B 5/14
[52] U.S. Cl. .............................. 350/96.30; 350/96.24; 427/165
[58] Field of Search ............. 350/96 WG, 96 B, 96 R; 427/165

[56] References Cited

U.S. PATENT DOCUMENTS

| 3,050,907 | 8/1962 | Hicks, Jr. et al. | 350/96 BC |
| 3,549,233 | 12/1970 | Eaglesfield et al. | 350/96 WG |
| 3,699,950 | 10/1972 | Humphrey, Jr. et al. | 350/96 C |
| 3,980,390 | 9/1976 | Yamamoto et al. | 350/96 WG |

*Primary Examiner*—John K. Corbin
*Assistant Examiner*—Stewart Levy
*Attorney, Agent, or Firm*—Walter S. Zebrowski; Clarence R. Patty, Jr.

[57] ABSTRACT

A buffered optical waveguide fiber suitable for use in forming an optical waveguide cable is described. An optical waveguide fiber is first coated with a glass protective coating applied to the exterior longitudinal surface of the fiber with a release agent coating applied over the glass protective coating. Thereafter, a protective layer of a thermoplastic synthetic resinous material surrounding the fiber is disposed over the coating of release agent.

13 Claims, 2 Drawing Figures

BUFFERED OPTICAL WAVEGUIDE FIBER

CROSS-REFERENCE TO RELATED APPLICATION

This is a continuation-in-part of application Ser. No. 593,286 filed July 7, 1975 now abandoned.

BACKGROUND OF THE INVENTION

The present invention relates to optical waveguide fibers but in particular to buffered optical waveguide fibers suitable for optical waveguide cable construction.

Optical waveguides are a relatively new development and no significant commercial use has taken place to date. In view of this, optical waveguide cable construction is a new art. Some of the problems encountered in optical waveguide cable construction are as follows. To provide useful optical waveguides, signal attenuation must be low and preferably about 10 db/kilometer or less. Optical waveguides transmit visible or invisible light. In the transmission of such light signals, they are readily attenuated in response to relatively small distortion of the optical waveguide. For example, relatively sharp bends, or a rough adjacent surface may produce sufficient distortions within the optical waveguide to result in totally unacceptable signal attenuation. Similarly, transverse or longitudinal stresses imposed upon the optical waveguide fibers during cable construction or inherent in the resulting structure may produce totally unacceptable signal attenuation in the resulting cable. These and many other problems have been encountered in producing an acceptable optical waveguide cable. In view of this, preparation of prior art fibers or wires for cable manufacture, has been found to be totally unacceptable.

For a better understanding of optical waveguide fibers and their manufacture, reference is made to the following U.S. patents: U.S. Pat. No. 3,659,915 issued to R. D. Maurer and P. C. Schultz; U.S. Pat. No. 3,711,262 issued to D. B. Keck and P. C. Schultz; U.S. Pat. No. 3,737,292 issued to D. B. Keck, P. C. Schultz and F. Zimar; U.S. Pat. No. 3,775,075 issued to D. B. Keck and R. D. Maurer; and U.S. Pat. No. 3,823,995 issued to L. L. Carpenter.

SUMMARY OF THE INVENTION

The objects of the present invention are to provide an optical waveguide fiber suitable for cable manufacture which does not increase signal attenuation through the optical waveguide fiber or maintains such increase in signal attenuation to a negligible level, provides ease of construction, provides long fiber life, and permits economic construction. In addition, it is an object of this invention to provide a buffered optical waveguide fiber which maintains the relatively fragile optical waveguide fiber in such manner as to prevent breakage.

Broadly, according to the present invention, a buffered optical waveguide fiber is provided to which a glass protective coating is applied to the external longitudinal surfaces of the fiber. The glass protective coating is then covered with a release agent coating. Thereafter, a protective layer of a thermoplastic synthetic resinous material surrounding the fiber is disposed over the coating of release agent.

Additional objects, features and advantages of the present invention will become apparent to those skilled in the art from the following detailed description and the attached drawing on which by way of example, only the preferred embodiment of this invention is illustrated.

DETAILED DESCRIPTION

Figure 1:
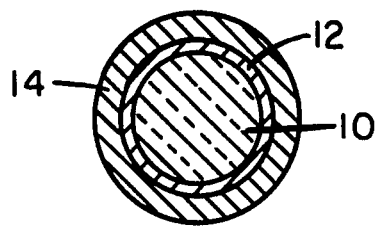
FIG. 1 is a cross-sectional view of a typical optical waveguide fiber with a glass protective coating and a coating of release agent applied thereto.

It is to be noted that the Figures of the drawing are illustrative and symbolic of the invention, and there is no intention to indicate scale or relative proportion of the elements shown therein.

Referring to FIG. 1, there is shown a typical optical waveguide fiber 10 constructed by, for example, any of the methods described in the heretofore noted U.S. patents. Operational theories and other pertinent information concerning lenses and optical waveguides may be found in "Solutions of Two Optical Problems" by A. Fletcher, T. Murphy and A. Yound, Proc. Roy., Society (London) Volume 223, pages 216–225, 1954; "Geometrical Optics of Parabolic Index-Gradient Cylindrical Lenses" by F. P. Kapron, Journal of the Optical Society of America, Volume 60, No. 11, pages 1433–1436, November, 1970; U.S. Pat. No. 3,157,726 issued to Hicks et al.; the publication entitled "Cylindrical Dielectric Waveguide Mode" by E. Snitzer, Journal of the Optical Society of America, Volume 51, No. 5, pages 491–498, May 1961; and in "Fiber Optics Principles and Applications" by N. S. Kapany, Academic Press, 1967.

To the exterior longitudinal surface of fiber 10, a glass protective coating 12 is applied by spraying, pulling the fiber through a pool of liquid, passing the fiber over a moistened wick, pulling the fiber through a coating die, or the like methods. The glass protective coating 12 may be any resinous material suitable for protecting the virgin glass surface of the fiber such as lacquer including nitro-cellulose, epoxies, silicones, acrylics, Kynar, or the like. A suitable acrylic may be Acryloid A-11 produced by the Rohm and Haas Corp. Kynar is a polyvinylidene fluoride-polytetrafluoroethylene copolymer produced by the Pennwalt Corp. Glass protective coating 12 protects the glass surface from dust particles, water, subsequent handling and the like immediately after the fiber is formed and prevents formation of imperfections in the glass fiber surface. Thereafter, a coating 14 of a release agent is applied over glass protective coating 12 by any of the means described in connection with coating 12. The release agent material may be any suitable lubricant such as silicone oil, petroleum lubricant, a layer of colloidal graphite, talc, or the like.

Figure 2:
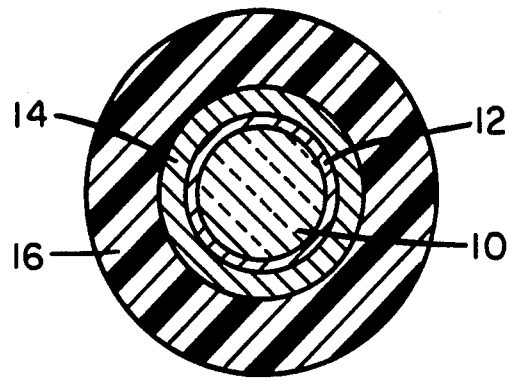
FIG. 2 is a cross-sectional view of the buffered optical waveguide fiber of the present invention.

Referring now to FIG. 2, there is illustrated a thin protective layer 16 of a thermoplastic synthetic resinous material surrounding fiber 10 and disposed over coating 14 of release agent. The protective layer material may be polyvinylchloride, neoprene, teflon, urethane, nylon, or the like. The protective layer material as well as the release agent should be materials which are compatible with each other, with the glass protective coating and with the optical waveguide material.

For the purposes of the present invention, an optical waveguide fiber with a glass protective coating, a coating of release agent and a protective layer as hereinabove described will be referred to as a buffered fiber.

Buffering as used herein is defined as the means for isolating an optical waveguide fiber from external forces or influences that cause increased signal attenuation through the fiber.

A typical example of the present invention is as follows. An optical waveguide fiber was produced in accordance with the methods taught in U.S. Pat. No. 3,823,995 issued to L. L. Carpenter. The fiber was then passed through a reservoir containing polyvinylidene fluoride-polytetrafluoroethylene copolymer and through a die so as to apply a coating thereof having a thickness of about 2.5 to 5 microns. The thusly coated fiber was then passed through a reservoir containing Dow-Corning 200 silicone oil produced by the Dow-Corning Corporation of Midland, Michigan, the silicone oil having a viscosity of 20 CS. In this manner, a film of silicone oil was applied to the exterior longitudinal surfaces of the coated fiber to form a coating of release agent. Immediately thereafter, a 0.004 inch thick protective layer was extruded over the layer of release agent to form a buffered optical fiber. The protective layer material was Roylar E-9, a 90 Shore A polytetramethylene-etherglycol based thermoplastic, commonly referred to as polyurethane elastoplastic. This material is produced by Uni-Royal Chemical, Division Uni-Royal, Inc., Naugatuck, Conn.

Six of such buffered optical waveguide fibers were then disposed in a substantially contiguous relationship with one another around a central buffered optical waveguide fiber to form an optical waveguide bundle that was thereafter encapsulated to form an optical waveguide fiber cable. Tests performed show that the individual optical waveguide fibers remained unbroken while signal attenuation did not significantly increase when the optical waveguide cable was subjected to various loading conditions.

Although the present invention has been described with respect to specific details of certain embodiments thereof, it is not intended that such details be limitations upon the scope of the invention except insofar as set forth in the following claims.

We claim:

1. A buffered optical waveguide fiber comprising
   an optical waveguide fiber,
   a resinous protective coating applied to the external longitudinal surface of said fiber,
   a coating of a release agent applied over said protective coating, and
   a protective layer of a thermoplastic synthetic resinous material surrounding said fiber disposed over said coating of release agent.

2. The buffered optical waveguide fiber of claim 1 wherein said coating of release agent is formed of silicone oil.

3. The buffered optical waveguide fiber of claim 1 wherein said synthetic resinous material is a polytetramethylene-etherglycol based thermoplastic.

4. The buffered optical waveguide fiber of claim 2 wherein said protective coating is polyvinylidene fluoridepolytetrafluoroethylene copolymer.

5. The buffered optical waveguide fiber of claim 4 wherein said synthetic resinous material is a polytetramethylene-etherglycol based thermoplastic.

6. The method of forming a buffered optical waveguide fiber comprising the steps of
   providing an optical waveguide fiber,
   applying a resinous protective coating to the external longitudinal surface of said fiber,
   applying a coating of a release agent over said protective coating, and
   applying a protective layer of a thermoplastic synthetic resinous material to each said fiber over said coating of release agent.

7. The method of claim 6 wherein said coating of release agent is formed of silicone oil.

8. The method of claim 6 wherein said synthetic resinous material is a polytetramethylene-etherglycol based thermoplastic.

9. The method of claim 7 wherein said resinous protective coating is polyvinylidene fluoride-polytetrafluoroethylene copolymer.

10. The method of claim 9 wherein said synthetic resinous material is polytetramethylene-etherglycol based thermoplastic.

11. The method of claim 10 wherein said coating of silicone oil is applied to said longitudinal surface of said fiber by drawing said fiber through a reservoir of silicone oil.

12. The method of claim 11 wherein said protective layer is extruded over said coating of silicone oil.

13. The method of claim 10 wherein said coating of silicone oil is applied by passing said fiber in contact with a wick moistened with said silicone oil.

* * * * *